(12) United States Patent
Rosskelly

(10) Patent No.: US 9,504,349 B2
(45) Date of Patent: Nov. 29, 2016

(54) CARAFE WITH OFF CENTRE OPENING

(75) Inventor: Drew Rosskelly, Botany (AU)

(73) Assignee: Breville Pty Ltd, Alexandria, NSW (AU)

( * ) Notice: Subject to any disclaimer, the term of this patent is extended or adjusted under 35 U.S.C. 154(b) by 1214 days.

(21) Appl. No.: 12/483,249

(22) Filed: Jun. 12, 2009

(65) Prior Publication Data

US 2009/0308878 A1    Dec. 17, 2009

(30) Foreign Application Priority Data

Jun. 12, 2008  (AU) ................................. 2008902949

(51) Int. Cl.
| | | |
|---|---|---|
| *A47J 41/02* | (2006.01) | |
| *A47J 31/56* | (2006.01) | |
| *A47J 41/00* | (2006.01) | |
| *B65D 81/38* | (2006.01) | |

(52) U.S. Cl.
CPC ............. *A47J 31/56* (2013.01); *A47J 41/0077* (2013.01); *B65D 81/3841* (2013.01)

(58) Field of Classification Search
CPC .... A47J 41/0016; A47J 31/50; A47J 41/028; A47J 41/02; A47G 19/2272; F25D 3/08
USPC ............. 215/6, 263, 371, 373, 378, 902, 10, 215/12.1, 12.2, 13.1; 220/23.91, 506, 220/592.16, 592.28, 23.87–23.89, 420, 220/592.27, 612, DIG. 29, 592.2, 592.17; 222/232, 567, 569, 570, 572, 573, 51; 99/292; D7/317
See application file for complete search history.

(56) References Cited

U.S. PATENT DOCUMENTS

| | | | | |
|---|---|---|---|---|
| 122,821 | A * | 1/1872 | Faxon .......................... | 215/12.1 |
| 142,613 | A * | 9/1873 | Chinnock ..................... | 222/489 |
| 163,203 | A * | 5/1875 | Howes ..................... | 220/592.28 |
| 200,065 | A * | 2/1878 | Kloczewski et al. ............ | 215/6 |
| 225,440 | A * | 3/1880 | Vasseur ......................... | 222/131 |
| 240,402 | A * | 4/1881 | Gee ................................ | 99/322 |
| 437,232 | A * | 9/1890 | Norton ......................... | 222/542 |
| 515,632 | A * | 2/1894 | Wallace ........................ | 222/130 |
| 533,390 | A * | 1/1895 | Grove ........................... | 220/569 |
| 672,025 | A * | 4/1901 | Walsh et al. .................. | 222/131 |
| 884,582 | A * | 4/1908 | Henn ........................... | 215/12.1 |
| 929,422 | A * | 7/1909 | Gumbert ..................... | 215/12.1 |
| 941,769 | A * | 11/1909 | Durand, Jr. .................. | 215/12.1 |
| 956,395 | A * | 4/1910 | Miller ......................... | 215/12.1 |
| 966,264 | A * | 8/1910 | Sultzbaugh ............. | 220/592.27 |
| 1,029,827 | A * | 6/1912 | Schuyler ..................... | 215/12.1 |
| 1,360,863 | A * | 11/1920 | Andrews ..................... | 215/12.1 |
| 1,431,189 | A * | 10/1922 | Smith ......................... | 215/13.1 |
| 1,462,334 | A * | 7/1923 | Mendenhall ..................... | 215/6 |
| 1,607,071 | A * | 11/1926 | Roy ............................ | 220/569 |
| 1,609,774 | A * | 12/1926 | Robertson .................. | 215/12.2 |

(Continued)

FOREIGN PATENT DOCUMENTS

GB             2213702 A  *  8/1989
WO   WO 2007106947 A1  *  9/2007

*Primary Examiner* — Steven A. Reynolds
*Assistant Examiner* — Javier A Pagan
(74) *Attorney, Agent, or Firm* — Molins & Co. Pty. Ltd

(57) ABSTRACT

A vacuum insulated carafe has a stainless steel body, with a stainless steel outer sidewall closed off, in part, by a cap. The cap has an eccentric opening and a reservoir affixed to the rim. The eccentric opening of the cap forms an off centre mouth that leads into the interior of the reservoir.

18 Claims, 10 Drawing Sheets

(56) References Cited

U.S. PATENT DOCUMENTS

| | | | | |
|---|---|---|---|---|
| 1,630,496 | A * | 5/1927 | Marshall et al. | 220/592.26 |
| 1,632,342 | A * | 6/1927 | Lambert | 99/315 |
| 1,673,653 | A * | 6/1928 | Wagner | 220/592.16 |
| 1,690,880 | A * | 11/1928 | Schmidt | 222/572 |
| 1,700,623 | A * | 1/1929 | Bleecker | 215/6 |
| 1,712,228 | A * | 5/1929 | Payson et al. | 215/12.1 |
| 1,760,321 | A * | 5/1930 | Seigheim | 215/12.1 |
| 1,760,378 | A * | 5/1930 | Siegheim | 215/12.1 |
| 1,877,290 | A * | 9/1932 | Forrest | 215/13.1 |
| 2,057,969 | A * | 10/1936 | Duevel, Jr. et al. | 215/12.1 |
| 2,106,122 | A * | 1/1938 | McGowan | 215/6 |
| 2,110,012 | A * | 3/1938 | Auban | 426/127 |
| 2,144,820 | A * | 1/1939 | Thomas | 215/12.1 |
| 2,321,998 | A * | 6/1943 | Wentworth et al. | 215/6 |
| 2,462,349 | A * | 2/1949 | Battilani | 99/292 |
| 2,504,916 | A * | 4/1950 | Zolot | 222/131 |
| 2,527,447 | A * | 10/1950 | Perl | 99/312 |
| 2,546,983 | A * | 4/1951 | Del Buttero | 219/436 |
| 2,553,344 | A * | 5/1951 | Weeks | 99/292 |
| 2,620,945 | A * | 12/1952 | Becker | 222/131 |
| 2,621,582 | A * | 12/1952 | Varney et al. | 99/302 R |
| 2,644,578 | A * | 7/1953 | Bramming | 206/585 |
| 2,692,703 | A * | 10/1954 | Bramming | 222/67 |
| 2,714,296 | A * | 8/1955 | Scavullo | 222/131 |
| 2,740,546 | A * | 4/1956 | Kowalski | 220/23.88 |
| 2,762,736 | A * | 9/1956 | Beuglet | 156/286 |
| 2,788,149 | A * | 4/1957 | Brown | 215/13.1 |
| 2,840,124 | A * | 6/1958 | Greene | 141/381 |
| 2,842,167 | A * | 7/1958 | Tupper | 141/381 |
| 2,946,491 | A * | 7/1960 | Bramming | 222/545 |
| 3,016,159 | A * | 1/1962 | Bramming | 222/156 |
| 3,017,047 | A * | 1/1962 | Payson et al. | 215/12.1 |
| 3,047,175 | A * | 7/1962 | Bramming | 215/12.1 |
| 3,108,840 | A * | 10/1963 | Conrad et al. | 312/400 |
| 3,110,408 | A * | 11/1963 | Bramming | 215/12.1 |
| 3,114,469 | A * | 12/1963 | Francis et al. | 220/592.27 |
| 3,152,729 | A * | 10/1964 | Piker | 222/131 |
| 3,205,678 | A * | 9/1965 | Stoner | 62/457.4 |
| 3,272,579 | A * | 9/1966 | Leonard | 312/400 |
| 3,337,073 | A * | 8/1967 | Angelo | 215/6 |
| 3,347,403 | A * | 10/1967 | Lehrman | 220/23.87 |
| 3,351,224 | A * | 11/1967 | Anderson | 220/592.27 |
| 3,356,243 | A * | 12/1967 | Piker | 215/13.1 |
| 3,705,661 | A * | 12/1972 | Davis | 215/6 |
| 3,776,433 | A * | 12/1973 | De Treitas | 222/519 |
| 3,809,275 | A * | 5/1974 | Ek | 215/12.1 |
| 3,844,450 | A * | 10/1974 | Johnson | 222/183 |
| 4,006,835 | A * | 2/1977 | Cummings | 215/12.1 |
| 4,071,160 | A * | 1/1978 | Vick | 220/592.2 |
| 4,098,397 | A * | 7/1978 | Mann et al. | 206/592 |
| 4,138,027 | A * | 2/1979 | Frye et al. | 215/12.2 |
| 4,157,779 | A * | 6/1979 | Ishii et al. | 228/176 |
| 4,164,174 | A * | 8/1979 | Wallsten | 99/415 |
| 4,184,601 | A * | 1/1980 | Stewart et al. | 215/13.1 |
| 4,196,721 | A * | 4/1980 | Posnansky | 126/680 |
| 4,198,993 | A * | 4/1980 | Martin et al. | 131/173 |
| 4,205,598 | A * | 6/1980 | Leuschner et al. | 99/307 |
| 4,301,942 | A * | 11/1981 | Kupperman et al. | 220/592.17 |
| 4,320,856 | A * | 3/1982 | Stewart et al. | 222/131 |
| 4,361,257 | A * | 11/1982 | Stone, Jr. | 222/464.1 |
| 4,481,779 | A * | 11/1984 | Barthel | 62/46.3 |
| 4,548,339 | A * | 10/1985 | Gorman | 222/129 |
| 4,553,676 | A * | 11/1985 | Zimmermann | 215/13.1 |
| 4,595,437 | A * | 6/1986 | Yamamoto | 156/87 |
| 4,625,884 | A * | 12/1986 | Zimmermann | 222/131 |
| 4,637,543 | A * | 1/1987 | Kucherer | 229/5.6 |
| 4,658,973 | A * | 4/1987 | Zimmermann | 215/12.1 |
| 4,702,385 | A * | 10/1987 | Shillington et al. | 220/481 |
| 4,718,566 | A * | 1/1988 | Wunder | 215/13.1 |
| 4,754,888 | A * | 7/1988 | Letsch et al. | 215/12.1 |
| 4,825,759 | A * | 5/1989 | Grome et al. | 99/307 |
| 4,886,176 | A * | 12/1989 | Steakley | 215/229 |
| 4,895,281 | A * | 1/1990 | Lorenz | 222/465.1 |
| 4,960,206 | A * | 10/1990 | Johannes | 206/459.1 |
| D313,529 | S * | 1/1991 | Bormioli | D7/317 |
| 4,984,707 | A * | 1/1991 | Fierthaler | 215/13.1 |
| 5,031,519 | A * | 7/1991 | Toida et al. | 99/340 |
| 5,165,327 | A * | 11/1992 | Ferrara, Jr. | 99/307 |
| 5,168,793 | A * | 12/1992 | Padamsee | 99/279 |
| 5,178,724 | A * | 1/1993 | Padamsee | 216/63 |
| 5,503,060 | A * | 4/1996 | Morecroft et al. | 99/295 |
| 5,518,138 | A * | 5/1996 | Boffito et al. | 220/592.27 |
| 5,634,256 | A * | 6/1997 | Fritschi | 29/455.1 |
| 5,687,874 | A * | 11/1997 | Omori et al. | 220/737 |
| 5,699,719 | A * | 12/1997 | Lucas et al. | 99/299 |
| 5,699,841 | A * | 12/1997 | Takagawa | 141/331 |
| 5,890,616 | A * | 4/1999 | Cravens et al. | 220/495.08 |
| 5,947,008 | A * | 9/1999 | Fullmer | 99/342 |
| 5,968,616 | A * | 10/1999 | Kakemura et al. | 428/34.2 |
| 5,968,618 | A * | 10/1999 | Miller | 428/34.6 |
| 5,996,824 | A * | 12/1999 | Grant et al. | 215/2 |
| 6,003,718 | A * | 12/1999 | Lu | 220/592.2 |
| 6,079,591 | A * | 6/2000 | Timms | 220/771 |
| 6,105,799 | A * | 8/2000 | Takagawa | 215/12.1 |
| 6,119,889 | A * | 9/2000 | Fujii et al. | 220/592.27 |
| 6,123,196 | A * | 9/2000 | Chiu | 206/508 |
| 6,126,024 | A * | 10/2000 | Ramirez et al. | 215/12.1 |
| 6,161,720 | A * | 12/2000 | Castle | 220/592.17 |
| 6,216,754 | B1 * | 4/2001 | Geroult et al. | 141/350 |
| 6,216,903 | B1 * | 4/2001 | Hirose et al. | 220/253 |
| 6,216,909 | B1 * | 4/2001 | Lin | 220/739 |
| 6,217,294 | B1 * | 4/2001 | Arnieri et al. | 417/239 |
| 6,273,306 | B1 * | 8/2001 | Takagawa | 222/509 |
| 6,308,846 | B1 * | 10/2001 | Muller | 215/13.1 |
| 6,332,557 | B1 * | 12/2001 | Moran | 220/592.16 |
| 6,371,328 | B1 * | 4/2002 | Yamada et al. | 220/592.2 |
| 6,386,431 | B1 * | 5/2002 | Lin | 228/223 |
| 6,394,322 | B1 * | 5/2002 | Sekiya et al. | 222/465.1 |
| 6,505,752 | B1 * | 1/2003 | Rolfes et al. | 220/592.16 |
| 6,626,326 | B2 * | 9/2003 | Murakami | 220/739 |
| 6,631,819 | B1 * | 10/2003 | Diak/Ghanem | 215/11.1 |
| 6,681,951 | B2 * | 1/2004 | Schlosser | 220/592.27 |
| 6,736,295 | B2 * | 5/2004 | Lin et al. | 222/475.1 |
| 6,802,438 | B2 * | 10/2004 | Thompson | 222/175 |
| 6,913,777 | B2 * | 7/2005 | Rebhorn et al. | 426/394 |
| 7,091,455 | B2 * | 8/2006 | Fung | 219/432 |
| 7,104,185 | B2 * | 9/2006 | Leung et al. | 99/292 |
| 7,201,098 | B2 * | 4/2007 | Wang | 99/286 |
| 7,284,674 | B2 * | 10/2007 | Ueda et al. | 220/560.1 |
| 7,284,677 | B2 * | 10/2007 | Guevara | 220/737 |
| 7,383,964 | B2 * | 6/2008 | Keller | 220/592.27 |
| 7,464,637 | B1 * | 12/2008 | Lin | 99/322 |
| 7,681,446 | B2 * | 3/2010 | Morimoto et al. | 73/292 |
| 7,797,807 | B2 * | 9/2010 | Ueda et al. | 29/455.1 |
| 7,975,868 | B1 * | 7/2011 | Flies et al. | 220/524 |
| 2002/0008113 | A1 | 1/2002 | Fujii et al. | 220/592.2 |
| 2002/0088810 | A1 * | 7/2002 | Murakami | 220/739 |
| 2002/0125258 | A1 * | 9/2002 | Kanno et al. | 220/592.28 |
| 2003/0010784 | A1 * | 1/2003 | Schlosser | 220/592.27 |
| 2003/0034357 | A1 * | 2/2003 | Lassota et al. | 222/1 |
| 2003/0209563 | A1 * | 11/2003 | Lin et al. | 222/131 |
| 2004/0173556 | A1 * | 9/2004 | Smolko et al. | 215/11.5 |
| 2005/0000373 | A1 * | 1/2005 | Coe | 99/567 |
| 2005/0034474 | A1 * | 2/2005 | Keller | 62/371 |
| 2005/0109794 | A1 * | 5/2005 | Murakami et al. | 222/51 |
| 2005/0263479 | A1 * | 12/2005 | Smolko et al. | 215/308 |
| 2005/0263480 | A1 * | 12/2005 | Smolko et al. | 215/308 |
| 2005/0284861 | A1 * | 12/2005 | Fung | 219/427 |
| 2007/0295684 | A1 * | 12/2007 | Fujii et al. | 215/12.1 |
| 2008/0006598 | A1 * | 1/2008 | Fujii et al. | 215/12.1 |
| 2008/0156814 | A1 * | 7/2008 | Hoffine | 220/592.01 |
| 2008/0164266 | A1 * | 7/2008 | Sun | 220/592.16 |
| 2009/0031902 | A1 * | 2/2009 | White et al. | 99/289 R |
| 2009/0045194 | A1 * | 2/2009 | Rhee | 220/23.89 |
| 2009/0139324 | A1 * | 6/2009 | Morimoto et al. | 73/292 |
| 2010/0288777 | A1 * | 11/2010 | White et al. | 220/592.18 |
| 2012/0199008 | A1 * | 8/2012 | White et al. | 99/283 |

* cited by examiner

CARAFE WITH OFF CENTRE OPENING

FIELD OF THE INVENTION

The invention relates to thermally insulated carafes and more particularly to a metal, thermally insulated carafe with an off centre opening into the reservoir.

BACKGROUND OF THE INVENTION

The present invention concerns itself with carafes, particularly carafes that are used in conjunction with drip filter coffee makers. Drip filter coffee makers generally dispense brewed coffee from an opening that is elevated above a station for a carafe. In coffee makers of this type, the station sometimes comprises a warming plate situated below a removable carafe. The warming plate keeps the coffee in the carafe warm. However, the continuous operation of the warming plate, besides consuming electricity, tends to degrade the quality of the coffee contained in the carafe. Thus, in more sophisticated examples of the drip coffee maker, the single wall glass carafe and warming plate is replaced by a thermally insulated carafe that does not require a warming plate.

A stainless steel, thermally insulated carafe is ideal for use in a drip filter coffee maker. It is durable, washable and aesthetically pleasing. However, the conventional vacuum technology that would normally be used in the fabrication of a stainless steel, thermally insulated carafe has certain disadvantages. First, the stainless steel is not transparent, and therefore the level of the brew within the carafe is not immediately ascertainable with a simple visual inspection as would be the case for a glass carafe. Second, conventional double wall vacuum technology as applied to a spun stainless steel vessel results in a vessel having a primary opening that is concentric with the cylindrical walls of the vessel. A single, central opening is no liability when the carafe is being filled, from above. However, keeping in mind that a small opening is preferred for heat retention, a centrally located opening is a liability when the contents of the carafe are being dispensed. This is particularly true because a conventional carafe has a wide body shape to maximise the carafe volume underneath the coffee machine's dispenser. Thus, in some carafe designs with a concentric fill opening, the carafe must be nearly inverted to dispense the entire contents of it.

OBJECTS AND SUMMARY OF THE INVENTION

It is an object of the invention to provide a metallic, thermally insulated vacuum carafe having inner and outer cylindrical side walls that define a vacuum chamber and having an internal reservoir, an opening in to the reservoir being off centre relative to the side walls.

In other embodiments, the carafe further comprises a lid and the lid is adapted to accept a stream of brewed coffee that is dispensed generally in alignment with a longitudinal centre line of the carafe, the lid diverting the brewed coffee into the eccentric opening of the reservoir.

In yet other embodiments, the lid incorporates a level detector and display mechanism.

BRIEF DESCRIPTION OF THE DRAWING FIGURES

In order that the invention is better understood, reference is now made to the following drawing figures in which.

BEST MODE AND OTHER EMBODIMENTS

Figure 1:
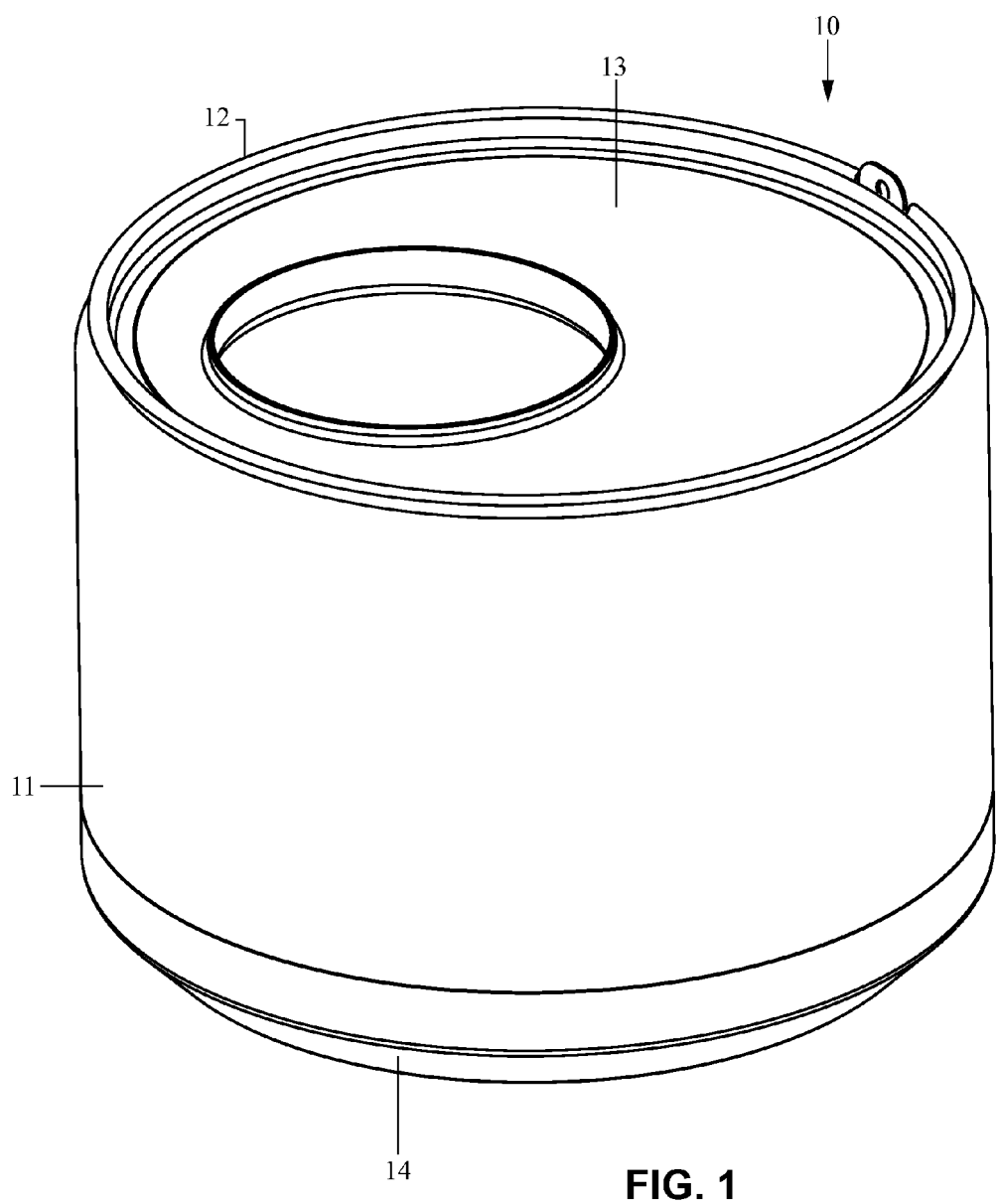
FIG. 1 is a perspective view of the body of a metallic, double wall, vacuum insulated carafe body.

As shown in the example of FIG. 1, the body 10 of a stainless, vacuum insulated carafe comprises a cylindrical outer sidewall 11. The upper extremity of the outer sidewall 11 is round and has an optional mounting rim ring 12 welded to it. Also welded to the outer wall 11 is a pressed cap 13. The lower portion of the body 10 comprises a base 14 that is affixed to or over a lower edge of the side wall 11, preferably overlapping it. The base 14 may be welded to the side wall 11. In the alternative, the base 14 may be polymeric component that is adhered to or snap fit onto the lower extremity of the outer sidewall 11.

Figure 2:
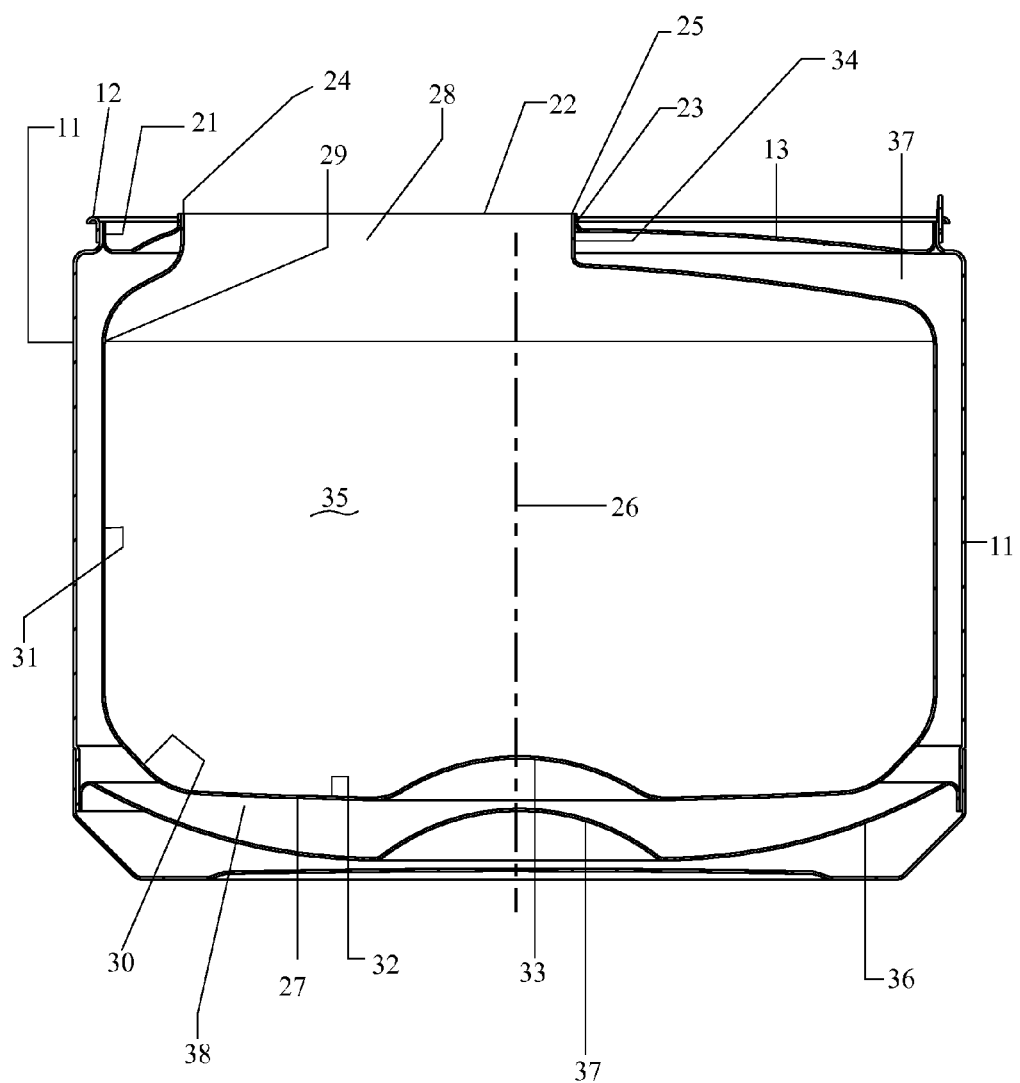
FIG. 2 is a cross section through the body depicted in FIG. 1.

As shown in FIG. 2, the cap 13 comprises a generally round metal sheet, press formed to incorporate a number of features. The cap 13 comprises an upstanding circular rim 21 that is welded to an interior surface of the outer sidewall 11. The cap 13 is slightly domed and at its highest point forms an eccentric or off centre opening 22 surrounded by a second or internal upright rim 23. Note that a radially outermost portion 24 of the opening 22 is closer to the cylindrical side wall than the radially inner most portion of the opening 25. FIG. 2 also illustrates that at least a portion of the opening 22 may be co-extensive or coincident with the longitudinal centre line 26 of the body. In preferred embodiments, a metallic reservoir 27 is welded to the cap's internal rim 23.

The reservoir 27 comprises a stainless steel vessel that is fabricated, for example, using both spin forming and pressing technologies. The upper portion of the reservoir 28 in this example comprises a press formed part having a circular lower edge 29 that is welded to a generally cylindrical spin formed basin 30. The basin 30 comprises generally cylindrical side walls 31 that are integral with the reservoir's bottom 32. The bottom 32 further comprises an inward extending dome 33 that provides rigidity against the influence of the vacuum that is provided between the reservoir and the outer sidewall of the body. The circular upper rim of the reservoir 34 is also eccentric with reference to the longitudinal centre 26 of the reservoir. Thus, the eccentric openings of the cap and reservoir cooperate to form an off centre mouth that leads into the interior 35 of the reservoir.

The vacuum integrity of the body is preferably maintained by providing an interior partition 36 that is rim welded to the interior of the external sidewall 11 and interposed between the reservoir 27 and the base 14. The partition 36 is preferably domed toward the base but also comprises a centrally located reverse dome 37 that generally follows the contours of the dome 33 formed in the floor of the reservoir. Thus, the cylindrical side wall 11, the cap 13, the partition 36 and the reservoir define a space or cavity 38 that can be evacuated to form a thermally insulating vacuum.

Figure 3:
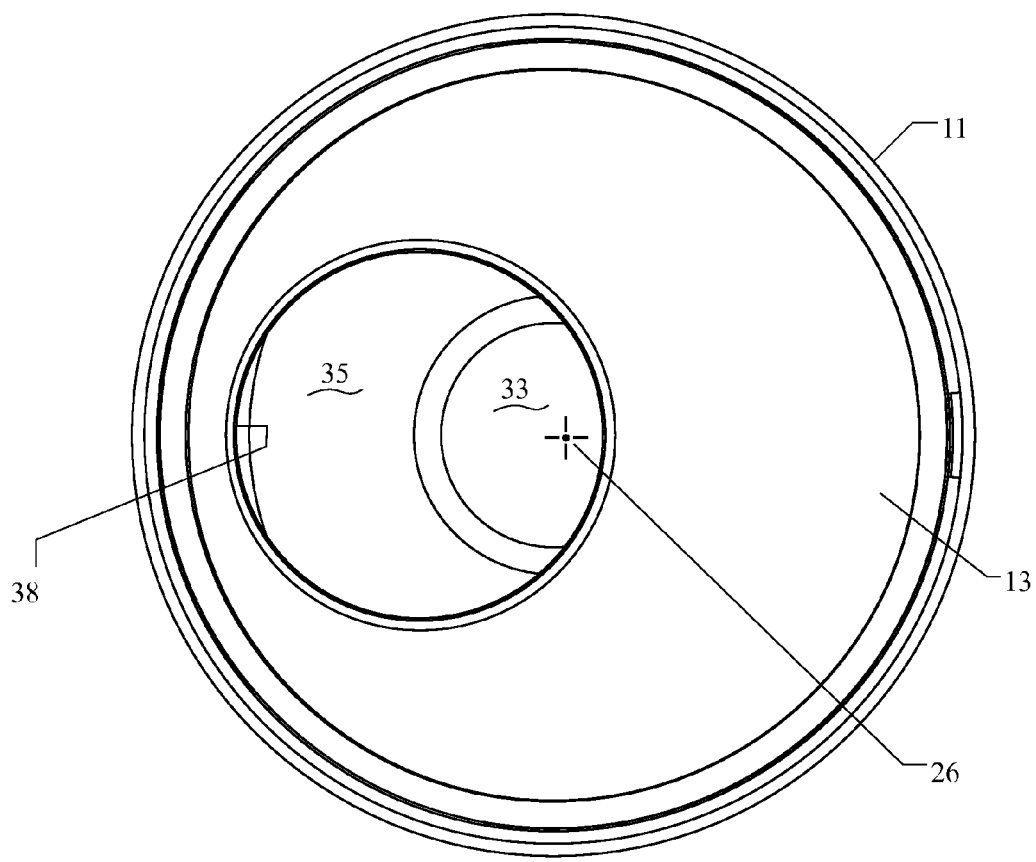
FIG. 3 is a top plan view of the body depicted in FIGS. 1 and 2.

As shown in FIG. 3, the cap opening is part of an off centre mouth into the interior of the reservoir comprises a circular opening that provides a convenient pour location 38 that is closer to the side wall 11 than any other part of the mouth while still optionally maintaining a clear passageway that is coincident with the longitudinal centreline 26 of the body. The off centre opening may be smaller than the one illustrated, in the interest of providing better heat retention. When the opening is smaller rather than larger, the opening will not be or need not be coincident with the longitudinal centreline 26 of the body. In examples of this kind, coffee from the drip coffee maker can enter the centre of the lid and be diverted into the opening by diverting it or through conduits located in the superstructure (or otherwise).

Figure 4:
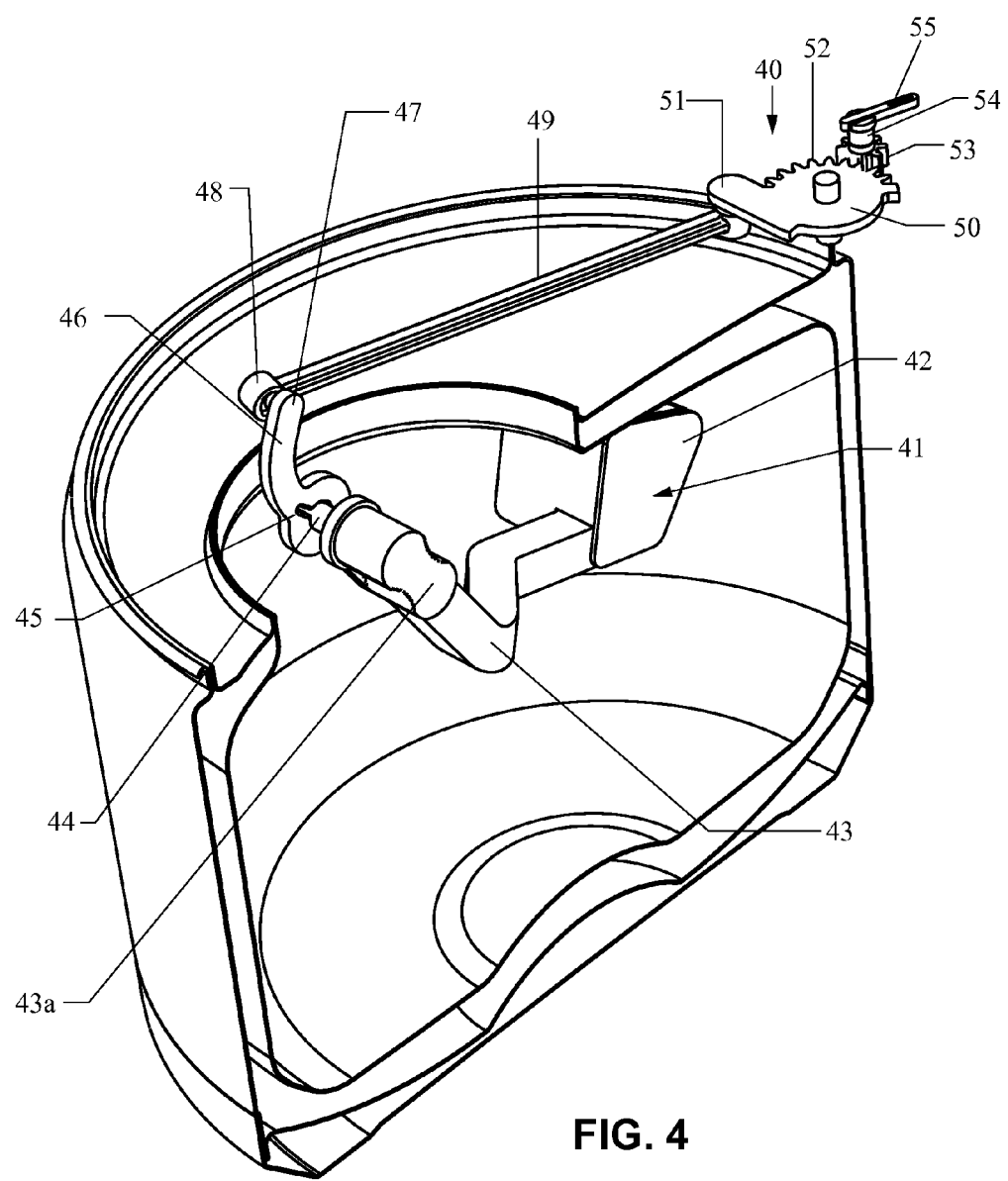
FIG. 4 is a cross sectional view of a carafe body also illustrating a level indicator mechanism in perspective view.

As shown in FIG. 4, a level indicator mechanism 40 comprises a gauge float 41 comprising a buoyant body 42 carried by an arm 43. The pivot end of the arm further comprises a receiving opening for a stub axle 44 that is carried by one end 45 of a lever arm 46. Although the float and float arm are snap connected into the lever arm's stub axle 44, the connection is rigid in rotation 50. Thus, rotation of the float 43 as the fluid level changes causes the lever arm 46 to also rotate. An optional finger grip 43a facilitates insertion and optional removal of the float and arm 41, 43 for cleaning. One end of the lever arm 46 comprises a portion of a ball joint assembly 47, for example, a ball. The other part of the ball joint assembly 48 is carried by one end of a gauge shaft 49. The gauge shaft 29 extends between the lever arm 46 and a rotating cog 50. The cog 50 has an extension 51 that is connected to one end of the gauge shaft 49. The provision of ball joint assemblies at each end of the gauge arm 49, particularly in that the ball joint assemblies are oriented 90 degrees to one another, allows the gauge shaft 49 to describe a motion that translates the rotation of the lever arm 46 into a rotation of the cog 50, but in a different plane. The cog 50 has teeth 52 that engage teeth 53 on a rotating pinion 54. The pinion carries a gauge dial indicator 55 that is visible through a view window located on a superstructure into which the level indicator mechanism is built. This superstructure is illustrated in FIG. 5.

Figure 5:
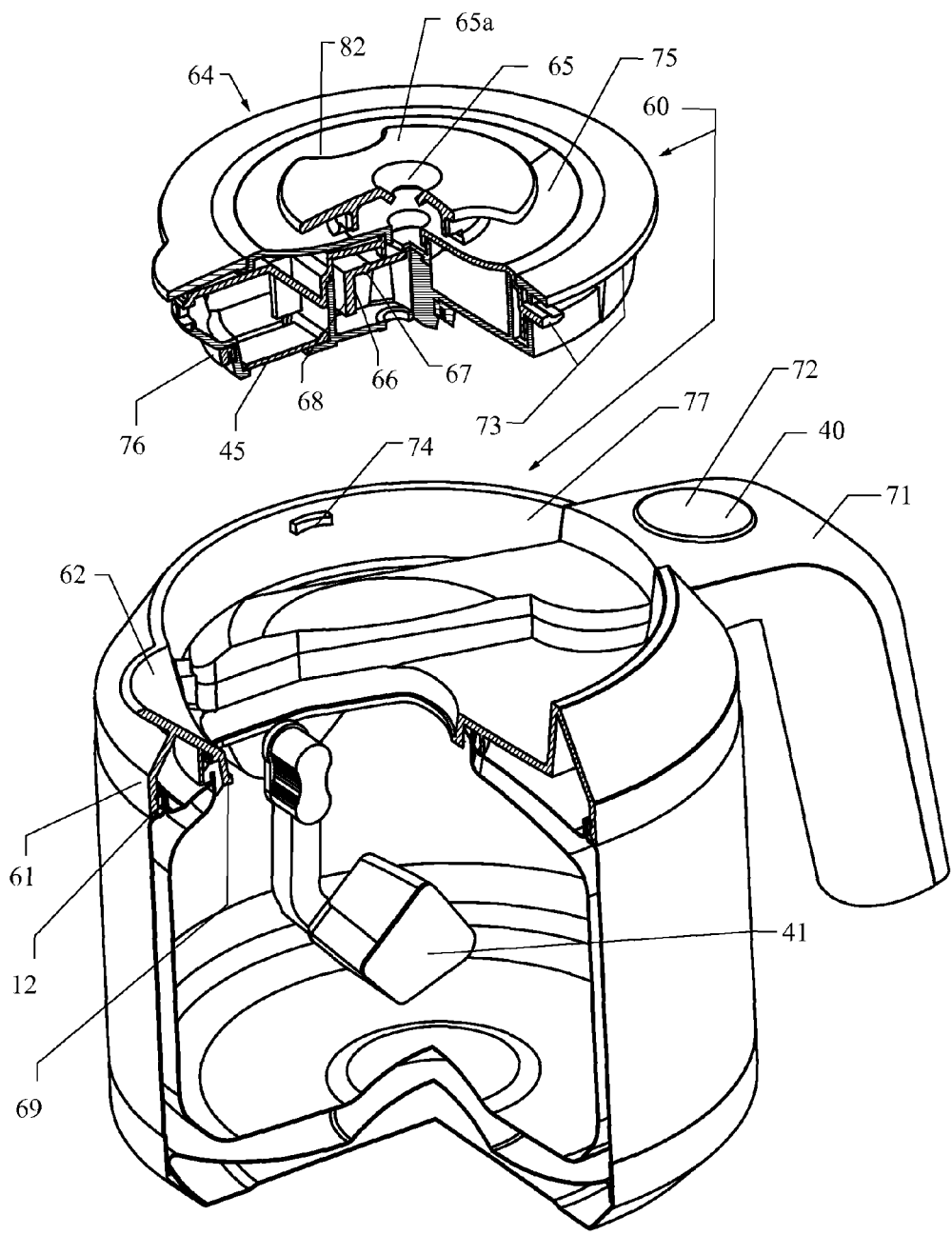
FIG. 5 is a perspective quarter sectioned view of a carafe body and a polymeric superstructure comprising a level indicator, handle, pour spout and lid.

As shown in FIG. 5, the carafe's polymeric superstructure 60 comprises a chassis with handle 71 that is snap fit by its peripheral rim 61 or otherwise affixed onto the carafe body's upper rim 12. The superstructure also comprises a removable lid 64.

The lid 64 has a fill opening 65 that is generally coincident with the longitudinal axis of the carafe. The fill opening 65 communicates with a passageway that leads to a counterweighted pivoting door 66 that is normally closed to aid in heat retention, but opens when, for example, brewed coffee passes from the fill opening 65 into the interior of the reservoir. The pivot axis 67 of the door 66 is located between the blocking portion of the door and a counterweight 68. Similarly, a rotating door 63 is interposed between the pour spout 62 and the reservoir when the lid is mounted. The door 63 is normally closed to assist in the retention of heat but pivots to open when the carafe is tilted during pouring. The area around the fill opening 65 preferably acts a bumper 65a that interacts with the drip stop valve (not shown) of the coffee machine that the carafe works with. The lid's bumper 65a is shown with scallops or finger recesses 82 that assist in attaching the lid 64 to the chassis by the cooperating bayonet fittings 73, 74 formed on an exterior of the lid and an interior wall of the chassis. The bumper 65a preferably sits in a funnel-like catchment for overflow 75. A circumferential polymeric seal 76 is interposed between the lid and the chassis.

The superstructure's chassis 77 forms a pouring spout 62 that communicates with the opening into the interior of the reservoir. The superstructure further comprises an inverted "U" shaped internal rim and cooperating polymeric seal 69 that cooperates with the mouth of the reservoir. The chassis supports the entire float 41 and indicator mechanism 40 shown in FIG. 4. The dial indicator 55 rests within a recess or insert located in the superstructure, generally near the handle 71. The recess 70 is covered by a clear lens 72.

Figure 6:
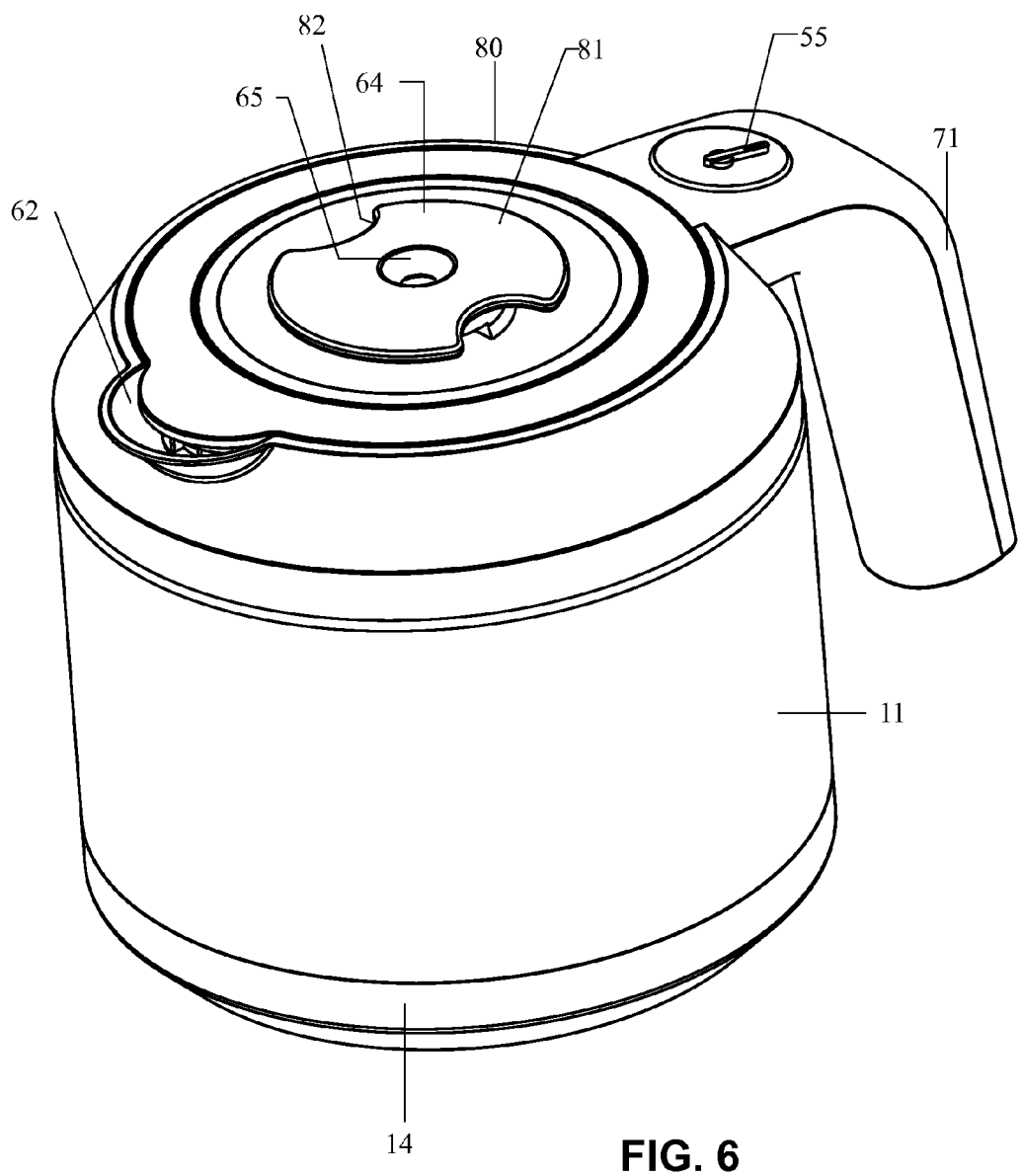
FIG. 6 is a perspective view of the carafe depicted in FIG. 5.

As shown in FIG. 6, the superstructure 80 is generally flush mounted with respect to the external surface of the side wall 11. The lid 64 sits centrally and the fill opening 65 as seen as being located along the longitudinal axis of the carafe and thus concentric with both the interior of the reservoir and the exterior of the side wall 11.

Figure 7:
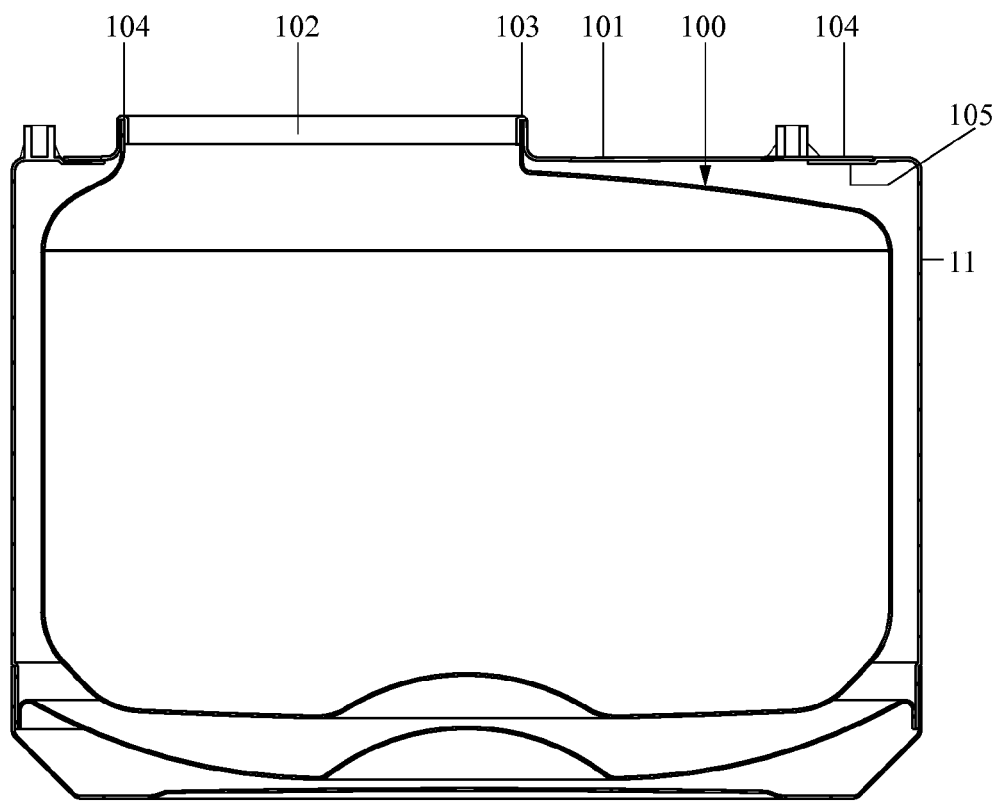
FIG. 7 is a cross sectional view of another embodiment of a carafe body.

FIG. 7 illustrates another method whereby a thermally insulated or vacuum insulated carafe body may be formed. In this example the internal reservoir 100 is similar to the reservoir disclosed and discussed with reference to FIG. 2, however, the body's cap 101 is flat, having press or roll formed into it and off centre opening 102 surrounded by inverted "U" shaped rim 103. The upper edge 104 of the opening in the reservoir is inserted into and sealed within the inversed "U" shaped rim 103. The generally circular edge 104 of the cap is carried above a step 105 formed into a peripheral edge of the upper extent of the side wall 11.

Figure 8:
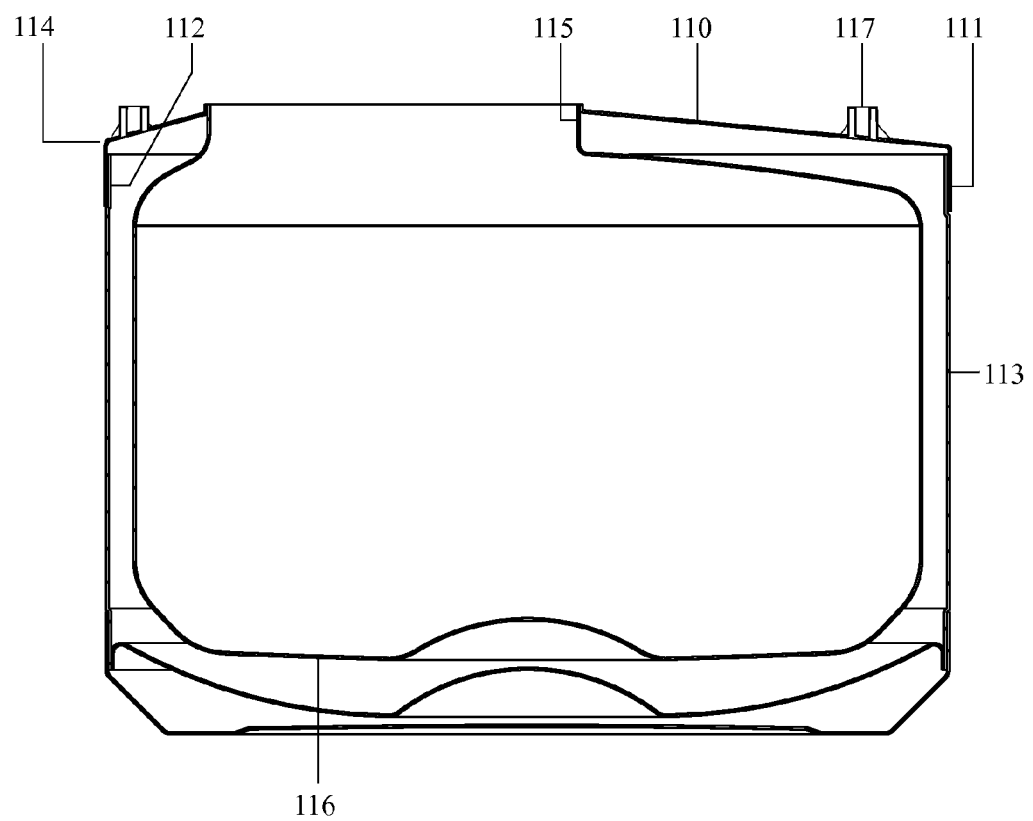
FIG. 8 is a cross section of a further embodiment of a carafe body.

The example depicted in FIG. 8 illustrates that the body's cap 110 need not be flat. In this example, the peripheral edge 111 of the cap 110 is down turned and joined to an inward step 112 formed around the upper edge of the side wall 113. Thus, the cap extends from a lower edge 114 adjacent to the join with a step 112, upward toward the upper rim 115 of the opening into the reservoir 116. Note in this embodiment that brackets 117 are formed on the upper surface of the cap to provide locations where the super structure affixed without the need for the body to have an upper fixing rim.

Figure 9:
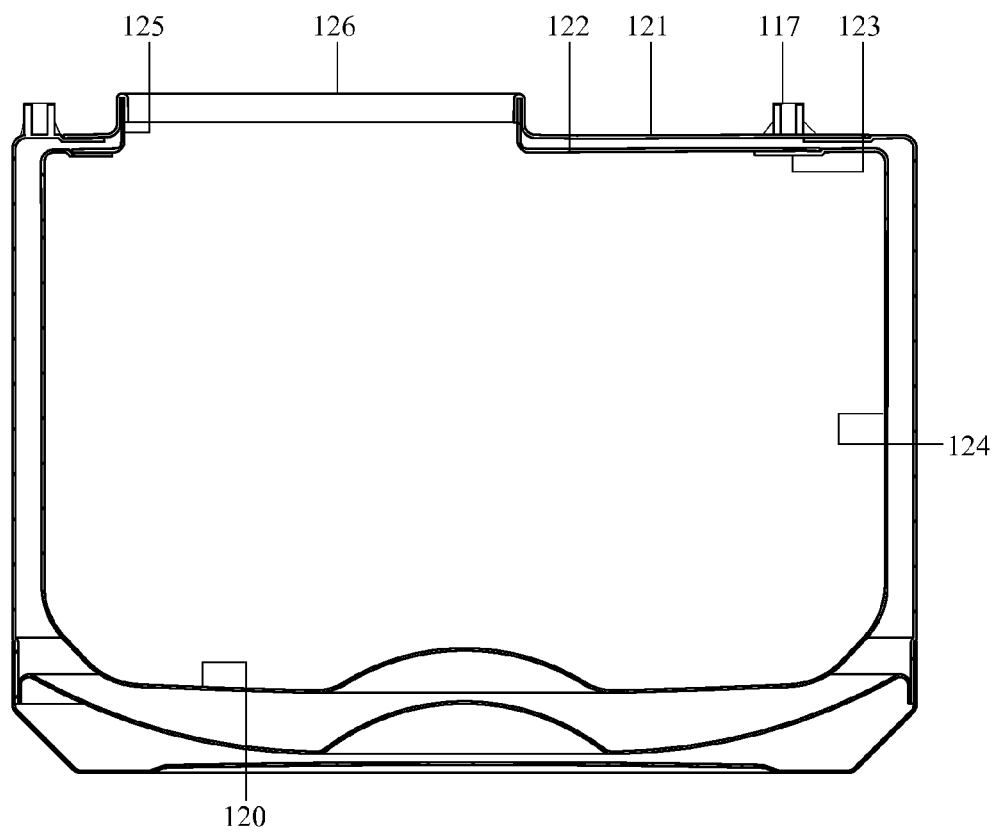
FIG. 9 is yet another cross section of an embodiment of a thermally insulated metal carafe body.

As shown in FIG. 9, both the reservoir 120 and the cap 121 may be formed flat. The upper portion 122 of the reservoir sits above and is preferably welded to a step 123 formed around the upper extent of the spun lower portion 124 of the reservoir. This upper portion 122 further comprises an upward extending rim 125 that is received within an inverted "U" shaped rim 126 formed in the otherwise flat cap.

Figure 10:
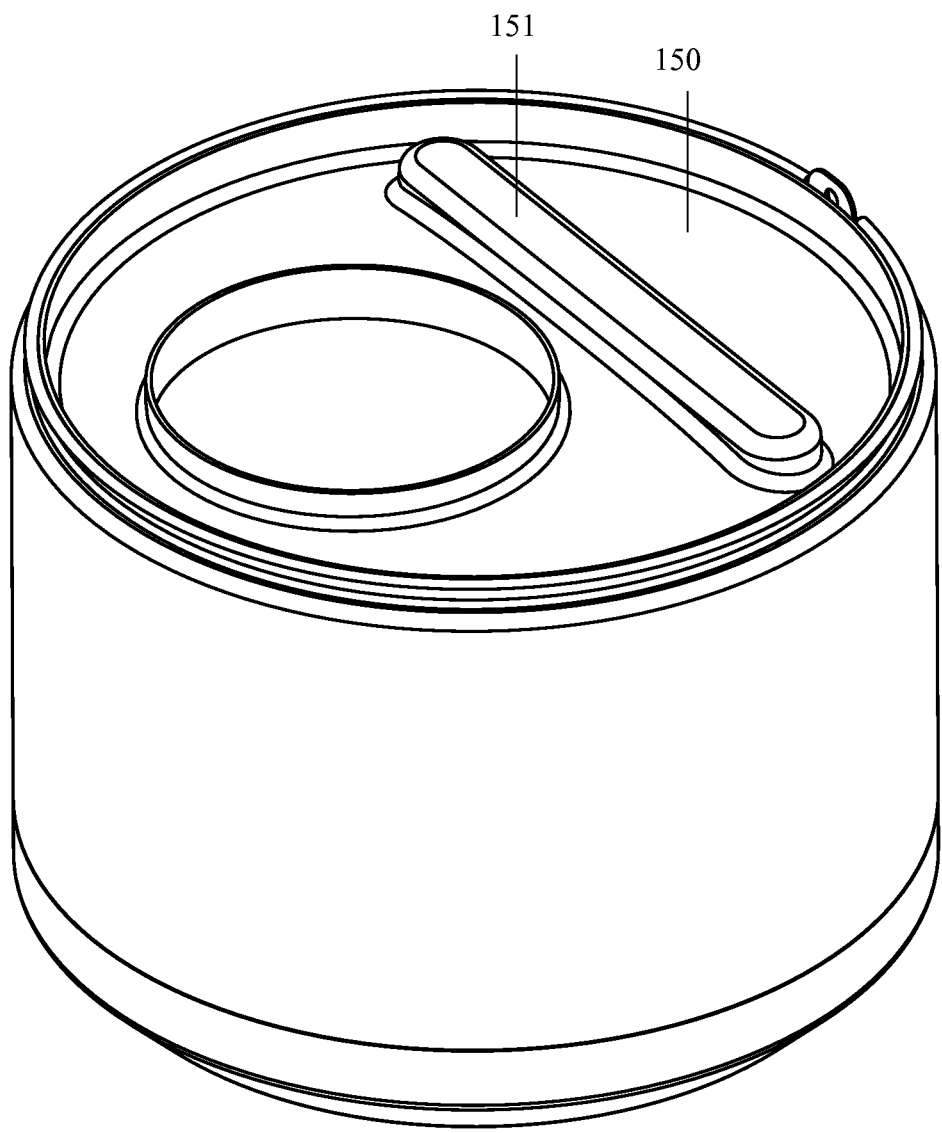
FIG. 10 is a perspective view of a carafe with a cap rib.

As shown in FIG. 10, the cap 150 may be stiffened or rigidised against the stress imposed by the vacuum by providing it with a reinforcing rib 151. In this example, the rib 151 is located across the portion of the cap with the longest unobstructed extent. The rib is also located transverse to the axis of symmetry of the cap. The rib 151 may be press formed into the cap, or welded on as a separate piece. In this example the rib has an inverted "U" shape, but it may also be formed as an inverted "V" or a simple beam.

Thus, it may be appreciated that the metal carafe body and metal reservoir of the present invention is able to be formed with an off centre opening into the interior of the vacuum insulated reservoir by combining, as required, spinning, roll forming, pressing and other metal fabrication techniques and combining these with a polymeric super structure to provide distinct user benefits.

In accordance with the above teachings, it will be appreciated that the carafe of the present invention, as exemplified by FIG. 6 provides a metallic vacuum insulated body that presents a convenient spout location as well as a convenient and centrally located fill opening. It does this without requiring a mouth into the reservoir that is as large as the mouth would have to be if it were concentric. The carafe also presents a convenient indicator that compensates for the metal's lack of transparency.

While the present invention has been disclosed with reference to particular details of construction, these should be understood as having been provided by way of example and not as limitations to the scope or spirit of the invention.

What is claimed is:

1. A vacuum insulated carafe having a body with a stainless steel sidewall and a stainless steel reservoir, a handle and a pouring spout, comprising:
   a stainless steel cap that extends between the reservoir and the sidewall, the cap having a first eccentric opening around which is formed a first upstanding rim;
   the stainless steel reservoir having a second upstanding rim surrounding a second eccentric opening in the reservoir;
   the first and second upstanding rims being joined together and sealed to contain a vacuum;
   a lid that cooperates with the first and second eccentric openings, the lid having an upper surface forming a funnel-like catchment for overflow;
   the lid having a bumper located above the catchment, the bumper having a fill opening that communicates with an interior of the reservoir.

2. The carafe of claim 1, wherein:
   an upper portion of the reservoir comprises a dome in which is formed the second upstanding rim and second eccentric opening; and
   the cap is domed.

3. The carafe of claim 1, wherein:
   the cap has a second and peripheral upstanding rim that is affixed to the sidewall.

4. The carafe of claim 1, further comprising:
   a polymeric superstructure for receiving the lid.

5. The carafe of claim 4, wherein the superstructure cooperates with a mouth formed by the joined first and second rims.

6. The carafe of claim 4, wherein:
   the superstructure further comprises the pouring spout.

7. The carafe of claim 4, wherein:
   the superstructure further comprises a handle.

8. The carafe of claim 4, wherein:
   the superstructure attaches to an upper rim of the sidewall.

9. The carafe of claim 4, wherein:
   the joined first and second rims define a mouth that is eccentric to the side all;
   the mouth does not form a clear passageway that is coincident with a longitudinal centreline of the body; and
   the lid is adapted to divert a flow of coffee from the fill opening to the mouth.

10. The carafe of claim 4, wherein:
    the joined first and second rims define a mouth that is eccentric to the sidewall; and
    the mouth defines a clear passageway that is coincident with a longitudinal centreline of the body.

11. The carafe of claim 4, wherein:
    an upper portion of the reservoir comprises a dome in which is formed the second upstanding rim and second eccentric opening; and
    the cap is domed.

12. The carafe of claim 4, wherein:
    the cap has a second and peripheral upstanding rim that is affixed to the sidewall.

13. The carafe of claim 4, wherein:
    the lid is concentric with the sidewall.

14. The carafe of claim 4, further comprising:
    a level sensing device comprising a float mechanism located in the reservoir and an indicator that is external to the reservoir.

15. The carafe of claim 1, wherein:
    the joined first and second rims define a mouth that is eccentric to the sidewall; and
    the mouth defines a clear passageway that is coincident with a longitudinal centreline of the body.

16. The carafe of claim 1, wherein:
    the joined first and second rims define a mouth that is eccentric to the side all;
    the mouth does not form a clear passageway that is coincident with a longitudinal centreline of the body; and
    the lid is adapted to divert a flow of coffee from the fill opening to the mouth.

17. The carafe of claim 1, wherein:
    the lid is concentric with the sidewall.

18. The carafe of claim 1, further comprising:
    a level sensing device comprising a float mechanism located in the reservoir and an indicator that is external to the reservoir.

* * * * *